United States Patent [19]

Harvey

[11] 4,173,401

[45] Nov. 6, 1979

[54] APPARATUS FOR DISPLAYING ALPHANUMERIC INFORMATION CODED ON A FILM CARTRIDGE

[75] Inventor: Donald M. Harvey, Webster, N.Y.

[73] Assignee: Eastman Kodak Company, Rochester, N.Y.

[21] Appl. No.: 905,689

[22] Filed: May 15, 1978

[51] Int. Cl.² .................. G03B 7/00; G03B 13/02; G03B 17/26

[52] U.S. Cl. ........................... 354/21; 354/58; 354/219; 354/275

[58] Field of Search .......... 352/78 C; 354/53, 54, 354/58, 21, 289, 275, 219, 224, 60, 60 A, 60 L, 155; 355/41

[56] References Cited

U.S. PATENT DOCUMENTS

| | | | |
|---|---|---|---|
| 3,505,937 | 4/1970 | Albedyll et al. | 354/21 |
| 3,581,643 | 6/1971 | Yoshimura | 354/54 |
| 3,670,638 | 6/1972 | Lindsay | 354/275 |
| 3,992,092 | 11/1976 | Place | 355/41 |
| 4,024,557 | 5/1977 | Aoyama et al. | 354/275 |
| 4,090,207 | 5/1978 | Mashimo et al. | 354/53 X |
| 4,114,995 | 9/1978 | Stieringer et al. | 354/289 X |

FOREIGN PATENT DOCUMENTS

| | | | |
|---|---|---|---|
| 1451597 | 7/1966 | France | 352/78 C |
| 416323 | 1/1967 | Switzerland | 354/21 |

*Primary Examiner*—Donald A. Griffin
*Attorney, Agent, or Firm*—D. P. Monteith

[57] ABSTRACT

A sensor in a camera detects code indicia on a film cartridge, representing information about the film in the cartridge, and an interface unit associated with the sensor transmits binary representations of the code to a microprocessor. A memory device contains a catalog of digital data representing information about a variety of films. The microprocessor selectively retrieves from memory those data corresponding to any of the information coded on the cartridge. Character generators, controlled by the microprocessor, effect display, preferably in the camera's viewfinder, of alphanumeric information representing the data selectively retrieved from memory.

7 Claims, 11 Drawing Figures

TABLE OF CODE COMBINATIONS

| ADDRESS | | FILM SPEED (ANSI) | FILM TYPE | COLOR SENSITIVITY | NUMBER OF EXPOSURES |
|---|---|---|---|---|---|
| 00 | 0000 | — | — | — | — |
| 00 | 0001 | 25 | COLOR SLIDE | DAYLIGHT | 12 |
| 00 | 0010 | ↓ | ↓ | ↓ | 20 |
| 00 | 0011 | ↓ | ↓ | ↓ | 36 |
| 00 | 0100 | 64 | COLOR SLIDE | DAYLIGHT | 12 |
| 00 | 0101 | ↓ | ↓ | ↓ | 20 |
| 00 | 0110 | ↓ | ↓ | ↓ | 36 |
| 00 | 0111 | 80 | COLOR PRINT | DAYLIGHT | 12 |
| 00 | 1000 | ↓ | ↓ | ↓ | 20 |
| 00 | 1001 | ↓ | ↓ | ↓ | 36 |
| 00 | 1010 | 100 | COLOR PRINT | DAYLIGHT | 12 |
| 00 | 1011 | ↓ | ↓ | ↓ | 20 |
| 00 | 1100 | ↓ | ↓ | ↓ | 36 |
| 00 | 1101 | 125 | B/W | — | 12 |
| 00 | 1110 | ↓ | ↓ | — | 20 |
| 00 | 1111 | ↓ | ↓ | — | 36 |
| 01 | 0000 | 160 | COLOR SLIDE | DAYLIGHT | 12 |
| 01 | 0001 | ↓ | ↓ | ↓ | 20 |
| 01 | 0010 | ↓ | ↓ | ↓ | 36 |
| 01 | 0011 | 125 | COLOR SLIDE | TUNGSTEN | 12 |
| 01 | 0100 | ↓ | ↓ | ↓ | 20 |
| 01 | 0101 | ↓ | ↓ | ↓ | 36 |
| 01 | 0110 | 400 | B/W | — | 12 |
| 01 | 0111 | ↓ | ↓ | — | 20 |
| 01 | 1000 | ↓ | ↓ | — | 36 |

FIG. 4

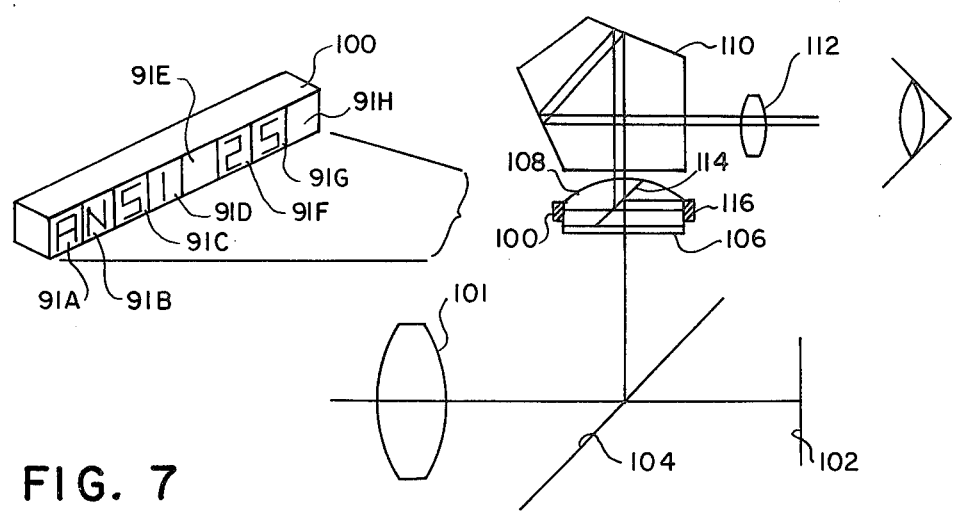
FIG. 7
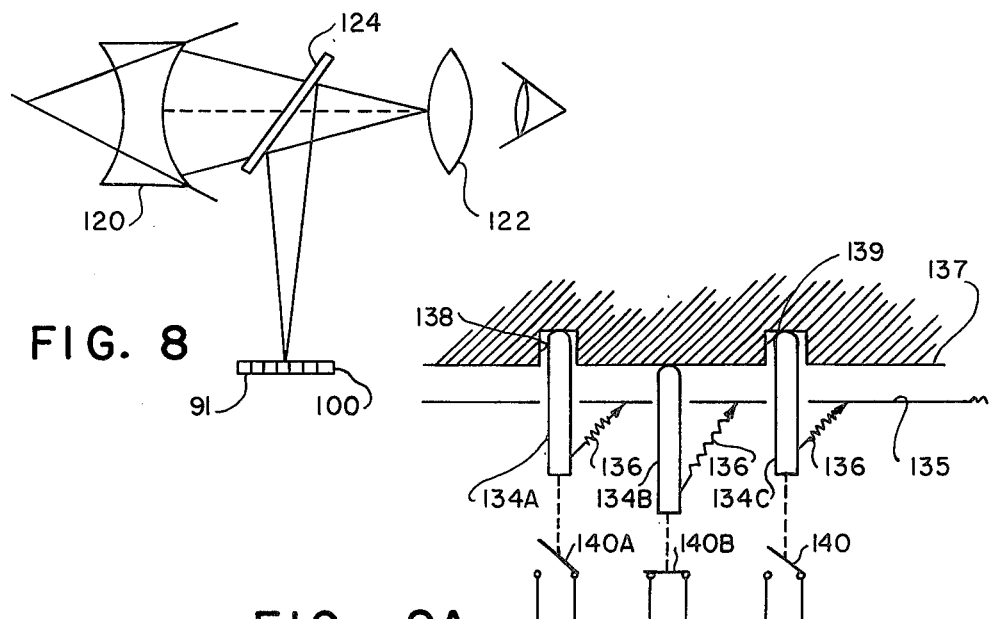
FIG. 8
FIG. 9A
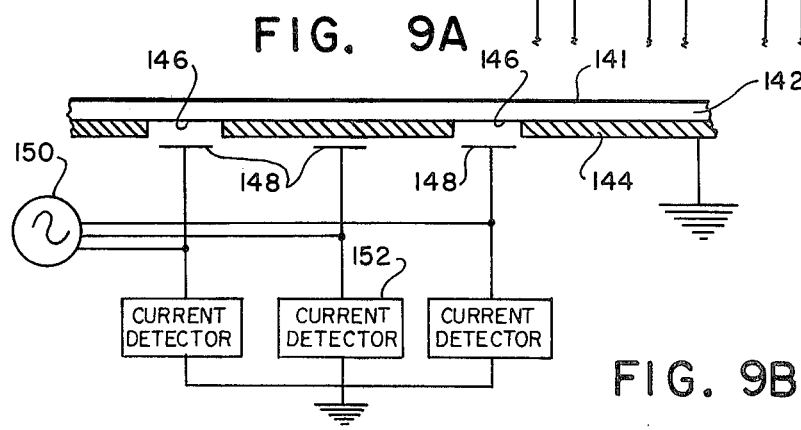
FIG. 9B

APPARATUS FOR DISPLAYING ALPHANUMERIC INFORMATION CODED ON A FILM CARTRIDGE

BACKGROUND OF THE INVENTION

1. Field of the Invention

The invention relates in general to apparatus for sensing coded information and for displaying such information in alphanumeric form. More particularly, the invention relates to camera apparatus for sensing film cartridge indicia representing a variety of information about the film in the cartridge and for selectively displaying any of such information.

2. Description Relative to the Prior Art

A camera user may need to be reminded of the characteristics of the film being used. Perhaps the camera has been stored for some time and the user cannot recall, for example, film speed, or whether the film is color or black and white, etc.

It is well known in the photographic art to provide coding on film cassettes, magazines and cartridges to represent any of several possible pieces of information. For example, U.S. Pat. No. 3,444,795, discloses eight tactile discontinuities on the body of a film cartridge, that are capable of providing 256 pieces of information. The coded information is intended to be used in sorting the cartridges prior to processing, although it is acknowledged that there also would be utility if the information were accessible to a camera mechanism capable of sensing the discontinuities on the cartridge.

U.S. Pat. No. 3,490,348 discloses a variety of radial projections coaxially disposed around the spool shaft of a film cartridge to indicate information about the film in the cartridge. The projections may be used for indicating the number of frames of film or the kind of film, as well as film sensitivity.

French Pat. No. 1,451,597 discloses a film cartridge having several discrete metallic contact surfaces spaced across its width for electrical sensing by contact fingers. This approach may be further refined by imbedding conductive code markers into electrically insulating material on the side walls of the film cassette, as is generally disclosed in U.S. Pat. No. 3,918,801.

U.S. Pat. No. 4,024,557 illustrates a film magazine made of an electrically conductive sheet material substantially covered by an insulating coating layer. Selected sections of the conductive sheet are left uncoated, thereby providing a binary coding system for film speed based on the pattern of conductive or nonconductive sections of the film magazine.

U.S. Pat. No. 3,450,382 discloses a motion picture film magazine that is provided with a notch indicative of film type. The presence of the notch indicates film for use in artificial light while the lack of a notch indicates film for use in natural light. A flag representing such information is positioned for movement into the optical path of a camera viewfinder so that the camera operator may be assured of using a filter proper for the lighting conditions under which an exposure is to be made.

The need to display information about the film being employed is particularly desirable in view of the large variety of commercially available films. A comprehensive intelligible display of film information provides a means to quickly determine the suitability of the film for the scene being photographed, or a means for checking to determine if the camera is adjusted properly for the film in the camera.

SUMMARY OF THE INVENTION

The present invention comprises a camera including memory means having addressable data storage locations for storing respective data representing characteristics of a variety of photographic films. The camera further includes means for sensing, on a film cartridge, indicia that represent at least one characteristic of film in the cartridge, and means controlled by the indicia sensing means for producing a first output signal representing that film characteristic. A computer receives such first output signal and, in response thereto, addresses the memory means to retrieve data corresponding to that one film characteristic, and produces a second output signal corresponding to the retrieved data. Display means coupled to the computer receives such second output signal and, in response thereto, produces an alphanumeric display identifying that one film characteristic.

The invention, its objects and advantages, will become more apparent in the detailed description of a preferred embodiment presented below.

DESCRIPTION OF THE DRAWINGS

In the detailed description of a preferred embodiment of the invention presented below, reference is made to the accompanying drawings, in which:

FIG. 4 is an illustrative table or schedule of bit configurations for coding information pertaining to several kinds of films;

FIGS. 7 and 8 are views of the display device of FIG. 6 in use with reflex and non-reflex cameras, respectively;

FIGS. 9A and 9B illustrate alternative embodiments of apparatus for sensing coded information on a film cartridge.

DESCRIPTION OF A PREFERRED EMBODIMENT

Because photographic cameras and film cartridges are well known, the present description will be directed in particular to elements forming part of, or cooperating more directly with, apparatus in accordance with the present invention. It is to be understood that camera and cartridge elements not specifically shown or described may take various forms well known to those having skill in the art. It is also to be understood that the term "film cartridge" as used herein is intended to include film cassettes, film magazines, film containers, and the like.

Figures 1, 2:
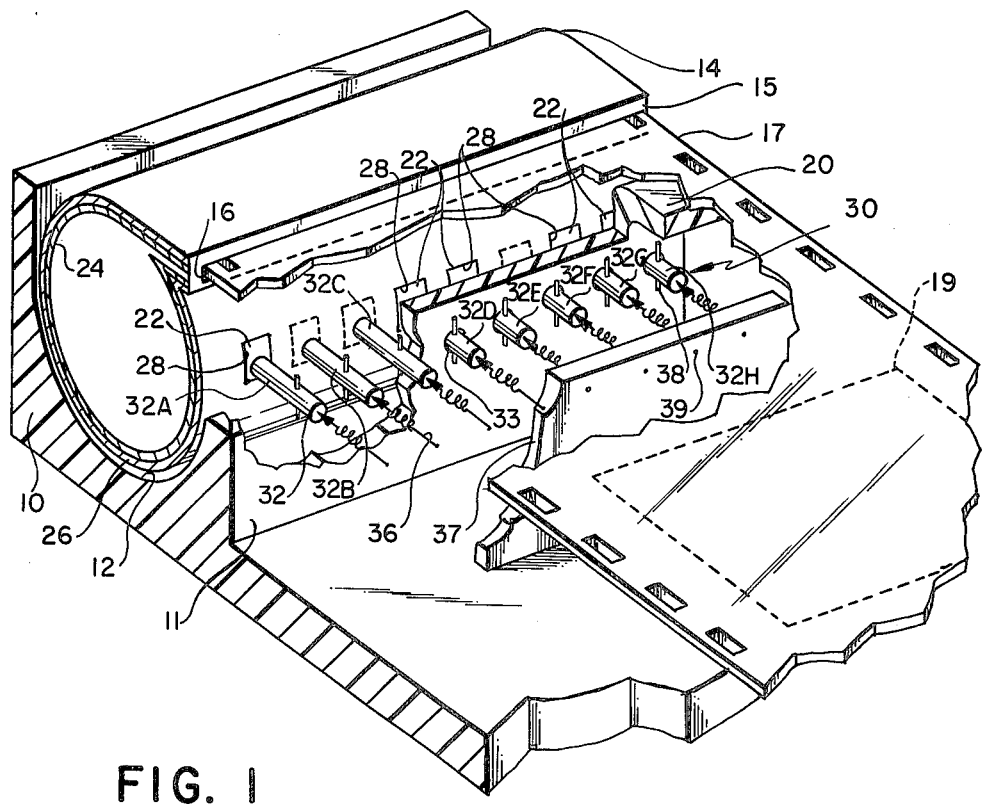
FIG. 1 is a perspective view of a coded film cartridge and associated code-sensing apparatus.
FIG. 2 is a schematic diagram of a binary sensing circuit for use with the code-sensing apparatus of FIG. 1.

Referring to FIG. 1, a camera includes a body portion 10 and an interior wall 11 that define an arcuate chamber 12 for receiving a cylindrical film cartridge 14. A planar member 15 extends tangentially from the top surface of the cartridge 14, as viewed in FIG. 1, and includes an elongate rectangular slot 16 at the end of member 15, through which film 17 is extracted, by means not shown, from the cartridge. Film 17 is located in a film exposure plane 19 by means of a film biasing plate a portion of which is shown.

Cartridge 14 includes a series of laterally spaced electrically conductive contacts 22. Each contact 22 constitutes an indicium and the pattern of indicia constitutes a code that, as explained hereinafter, represents information about the film in the cartridge. Contacts 22 are formed from an inner conductive sheathing 24, which is surrounded by an insulating overcoat 26. A series of laterally spaced apertures 28 in the overcoat 26 expose the underlying conductive sheathing 24 to define the conductive contacts 22 and the pattern of indicia formed thereby.

It shall be apparent that other arrangements for forming contacts 22 may be employed. For example, small metallic contact blocks may be secured directly to overcoat 26 by means of a suitable adhesive. Also, it shall be apparent that the contacts may be located on the contents of the cartridge such as on a film leader or on the film itself. For purposes of this description and the appended claims, reference to the "cartridge" as the situs of the code indicia shall include any contents of the cartridge.

Also shown in FIG. 1 is code-sensing apparatus, denoted generally at 30, for sensing the contacts 22 on cartridge 14. Apparatus 30 includes a series of laterally spaced electrical contact pins 32 (numbered individually 32A through 32H) which extend through respective apertures 33 in interior camera wall 11 in alignment with the respective sites for contacts 22. Biasing elements 36, illustrated as coil springs, are lodged between a second interior wall 37 and pins 32, and urge the pins into secure contact with cartridge 14. A stop member 38 is attached to each pin 32 to retain the pins in their respective apertures 33 against the bias force of springs 36. Springs 36 are embedded in wall 37, as represented by the numeral 39, to maintain them in alignment with their respective pins 32.

The code-sensing apparatus also includes digital circuitry, shown in FIG. 2 and denoted generally at 40, for producing a given signal when a pin 32 detects the presence of a contact 22. Circuit 40 has two stable electrical output states and operates as an inverter circuit, as follows. When base electrode voltage $V_B$ of a transistor 41 is low, the transistor does not conduct, and no current flows from the supply voltage $V_{cc}$ through a resistor 42 to ground. As a result there is no voltage drop across resistor 42, and output voltage $V_{out}$ is at a high level, designated state 1, which is essentially that of the supply voltage $V_{cc}$. When voltage $V_B$ is at a high level, transistor 41 conducts. Accordingly, a collector current flows, and there is a substantial voltage drop across resistor 42. As a result, the output voltage drops almost to ground potential, or state 0. In other words, when the voltage $V_B$ is low, the output voltage $V_{out}$ is high, i.e. state 1, and when $V_B$ is high, $V_{out}$ is low i.e. state 0.

To sense the presence of a contact 22, circuit 40 includes a double pole switch 43 between the emitter electrode 41A and base electrode 41B of cransistor 41. One pole of switch 43 is formed from one of the pins 32, specifically pin 32A, which is connected to emitter electrode 41A through ground. The other pole is formed from a selected one of the other pins 32, pin 32B for this example, which is connected to base electrode 41B. Conductive sheath 24 is the element by which the two poles of the switch 43 may be electrically connected. If apertures 28 are formed in the overcoat 26 in alignment with pins 32A and 32B, such pins mutually contact conductive sheath 24 to form a closed circuit, thereby effectively short circuiting the base-emitter junction of transistor 41. In the absence of an aperture 28 under pin 32B, switch 43 remains open since pins 32A, 32B can not be electrically connected by means of sheath 24.

Circuit 40 operates when a voltage $V_{cc}$ is applied as follows. If switch 43 is open, indicating the absence of a contact 22 under pin 32B, transistor 41 conducts and its output voltage is low level, i.e., state 0. If, however, switch 43 is closed, indicating that a contact 22 is present under pin 32B (and, of course, pin 32A) transistor 41 does not conduct. In that condition, the output of transistor 41 is at state 1. Therefore, circuit 40 distinguishes between the presence and absence of a contact 22 on cartridge 14 when a voltage is applied to the circuit.

A similar circuit is provided for each of pins 32 (other than the grounding pin) to determine the presence or absence of a contact 22 aligned with each pin. In each such circuit, pin 32A serves the common purpose of a grounding connection.

Figure 3:
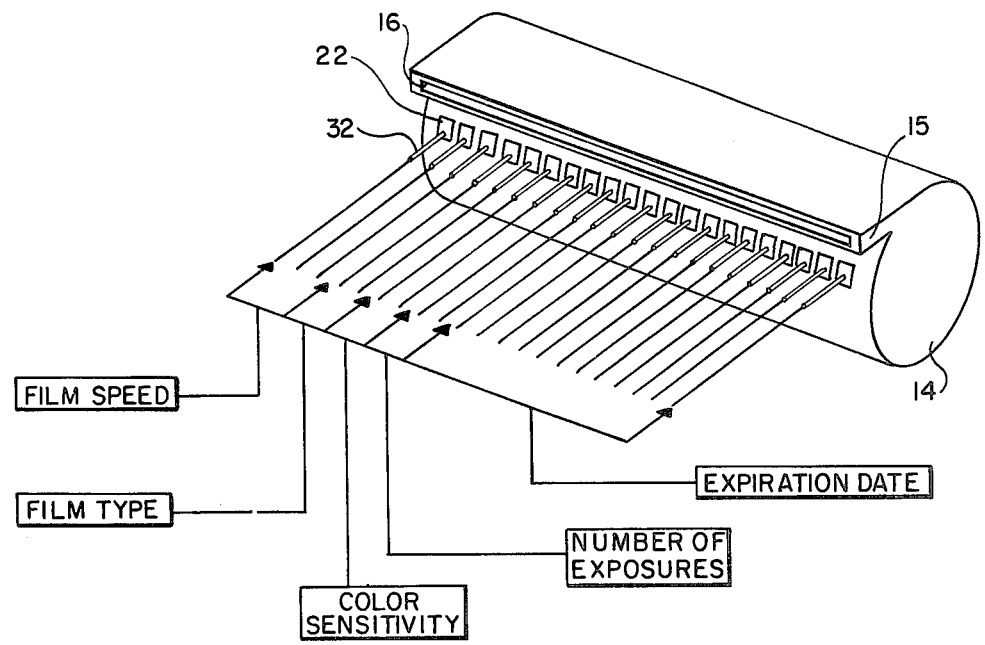
FIG. 3 illustrates an arrangement for information coded on the cartridge of FIG. 1.

Each possible location of a contact 22 serves to represent the equivalent of either a binary "1" or a binary "0" ("1" when a contact 22 is present and "0" when the contact is absent). By subdividing possible contact locations into groups, so as to form code groups, a plurality of film characteristics can be represented by a like plurality of binary code groups. For example, there is shown in FIG. 3 an arrangement, called a "position code", in which clusters of pins 32 are grouped together, each group serving to provide coded information relating to a particular film characteristic such as, for example, film speed, film type, number of exposures, and film expiration date.

In the case of representing any of 7 film speeds, three contact locations are required. For example, the following selection of film speeds may be represented in binary form:

| Film Speed (ANSI) | Contact "bits" |
|---|---|
| (uncoded cartridge) | 000 |
| 25 | 001 |
| 64 | 010 |
| 80 | 011 |
| 100 | 100 |
| 125 | 101 |
| 160 | 110 |
| 400 | 111 |

Other film characteristics, such as film type (color slide, black-and-white or color print), color sensitivity (daylight, photolamp, or tungsten), and number of exposures (12, 20 or 36) can each be represented by the grouping together of two contact locations to form a two-bit binary representation.

An alternative arrangement may be employed to represent a combination of film characteristics. This arrangement, identified herein as a "combination code," is best shown by the tabular listing of bit configurations in FIG. 4. Each combination code constitutes an address and represents a film of a particular type having, for example, a particular film speed, color sensitivity and number of exposures. As before, a "0" in the address refers to the absence of a contact 22 on cartridge 14, and each "1" in the address refers to the presence of a contact.

Figure 5:
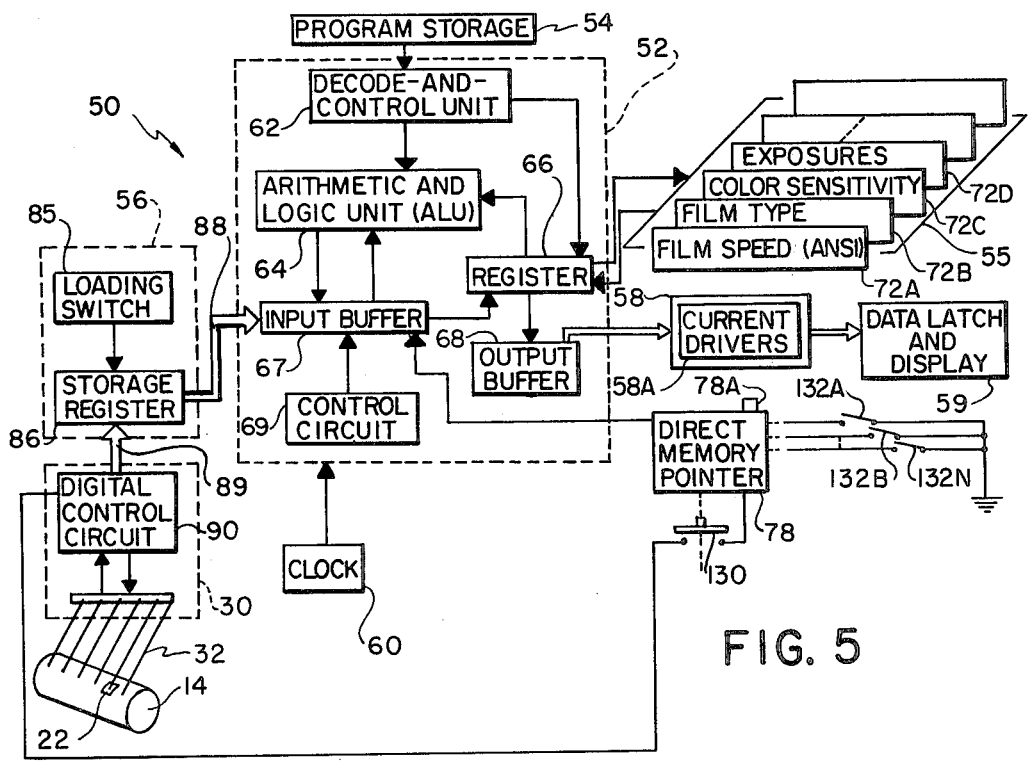
FIG. 5 is a block diagram of a presently preferred embodiment of apparatus constituting the present invention.

Referring to FIG. 5, there is shown apparatus, denoted generally at 50, for sensing contacts 22 on cartridge 14 and for providing a visual alphanumeric representation of the information represented by the pattern of such contacts. Apparatus 50 includes a microprocessor 52 which performs arithmetic and logic operations and data manipulations, following instructions stored in a program storage 54. A read-only memory (ROM) 55 constitutes storage apparatus for a catalog of data representing information about a variety of films that can be employed in the camera. An interface unit 56 allows the microprocessor to receive data relating to the film information coded on the cartridge. An output device 58 receives signals from the microprocessor that serve to produce an alphanumeric display, by means of a data latch and display device 59, of the information represented by the coded data on the cartridge. Finally, an electronic clock 60 provides timing pulses for synchronously regulating the operations of the microprocessor.

The microprocessor includes a decode-and-control unit 62 for decoding program instructions received from program storage 54. An arithmetic and logic unit (ALU) 64 performs data arithmetic and logic operations, and a register 66 receives input data from interface unit 56 through an input buffer 67, and serves as an easily accessible memory for data to be manipulated by the ALU and for data to be supplied to an output buffer 68.

The microprocessor includes other basic components such as address buffers for supplying program storage 54 with the address from which to fetch the next instruction, and accumulators for handling frequently manipulated data. Such components are illustrated as collectively performed by a control circuit 69.

The description of apparatus 50 and in particular microprocessor 52 is limited to that believed to be necessary to enable any person skilled in the art to practice the invention. Further descriptive material relating to microprocessors is widely available such as, for example, *Microprocessor and Microcomputers,* by B. Soucek, (Wiley, 1976), the disclosure of which is incorporated herein by reference.

ROM 55 consists of a series of memory banks, each bank having a memory capacity for storing data representing a particular category of film information for the variety of films which can be employed in the camera. These banks are shown in FIG. 5 as a series of separate memories denoted 72A, 72B, 72C, etc. A first bank 72A contains film speed information, a second bank 72B contains film type information, i.e., color slide, black and white, etc., a third bank 72C contains color sensitivity information, etc.

Each memory cell or address in each bank 72 contains electrical representations of binary data which, in turn, correspond to an alphanumeric representation of a particular film characteristic. For example, referring to the table of FIG. 4, the signals stored at the address 000010 in memory bank 72A, represent "ANSI 25."

Referring back to FIG. 5, a direct memory pointer 78 serves as a digital counter and determines which of the banks of ROM 55 is to provide information to the microprocessor. If, for example, memory pointer 78 has a count of three, data from a particular address in the third bank, i.e., bank 72C, (film color sensitivity data) is read into the microprocessor.

Interface unit 56 includes a loading switch 85 and a data storage register 86. Switch 85 serves as a gate for transmitting data temporarily stored in register 86, along data transfer lines 88 to input buffer 67. Such data represents a variety of information about the particular film in the cartridge and is transferred to storage register 86 along data transfer lines 89 from code-sensing apparatus 30.

Code-sensing apparatus 30, discussed previously and illustrated in FIGS. 1 and 2, includes a digital control circuit 90 which both applies voltage signals to electrical contact pins 32, and receives signals relating to the information coded on the cartridge. For this purpose, circuit 90 includes a plurality of the modified inverter circuits 40 shown schematically in FIG. 2 and previously described. A binary word is produced by circuit 90 in accordance with the pattern of contacts 22 aligned with pins 32.

Data latch and display device 59 produces alphanumeric displays of any of the information represented by the code indicia on the cartridge.

Figure 6:
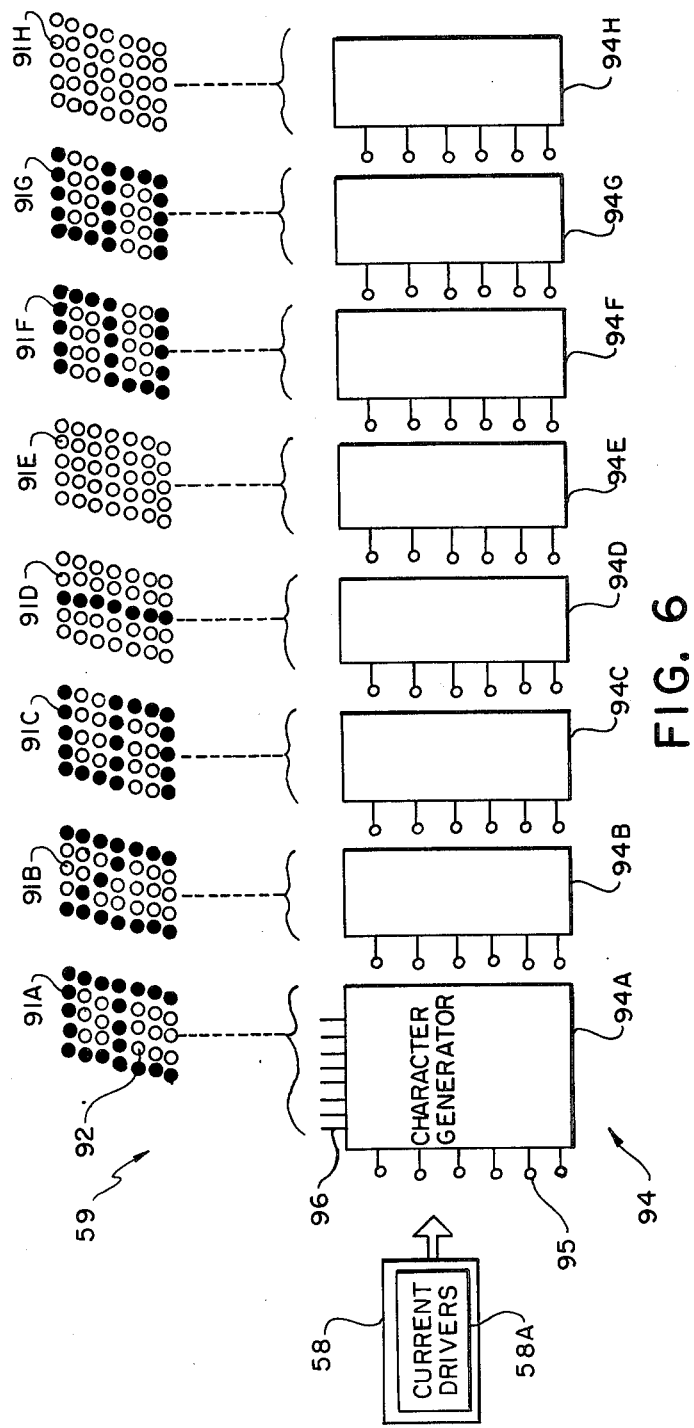
FIG. 6 is a partially pictorial and partially schematic representation of a digital matrix display device used in connection with the apparatus of FIG. 5.

Referring now to FIG. 6, device 59 includes a series of matrix display devices, denoted individually 91A through 91H. Each display 91 consists, for example, of a 5 by 7 matrix of indicator elements 92, which are preferably conventional light-emitting diodes, arranged to create any of the numerals 0 through 9 and any of twenty-six upper case Roman alphabetic characters. These thirty-six alphanumeric characters are generated under the control of a character generator 94. The character generator includes a series of programmable read-only memories (PROM's) denoted individually 94A through 94H. Each PROM is addressed by a series of input address lines 95. Output lines 96 are provided for independently energizing each LED of the respective matrix displays 91A through 91H. The number of output lines 96 is equal to the number of elements to be controlled, in this example thirty-five, while the number of input address lines 95 is related to the number of alphanumeric characters desired for display, in this example thirty-six. With a LED display matrix for twenty-six letters and ten numerals, a PROM is required that is capable of producing thirty-six digital output words. Accordingly, since six binary bits are required to address any of thirty-six locations, six input address lines 95 are required to digitally address thirty-six PROM addresses, and thirty-five outputs are required to control the thirty-five indicator elements 92 in each display device 91. Also, since there are eight character generators 94 and three binary bits are required to address individually eight entities, three additional address lines 95 would be required to form character generator addresses. A Texas Instrument TII 508 Alphanumeric Matrix Display is suitable for this purpose.

In lieu of PROMS 94A through 94H, one PROM can be provided with alternating connections to each of the display elements 91A through 91H. The PROM would cycle through each element 91, the response time of each element being such that the total visual image is perceived sumultaneously.

Referring to FIGS. 7 and 8, the matrix display devices 91A through 91H are incorporated in a display panel 100 shown in this example as linear. FIG. 7 shows basic optical elements of a single lens reflex camera. Located between an objective lens 101 and a film plane 102 is a tiltable mirror 104 which reflects light entering through lens 101 upward onto a focusing screen 106 where an image on the screen is projected through a condenser lens 108, a penta-prism 110 and a viewfinder eyepiece 112. The condenser lens 108 is provided with a half-mirror 114 which deflects part of the light onto a light-receiving element 116, which is arranged at a side of lens 108. Arranged on the opposite side of lens 108 is the linear display panel 100. The light from display devices 91 is reflected by the half-mirror 114 to the penta-prism 110 and therefrom directed to the eyepiece 112.

FIG. 8 illustrates linear display panel 100 with a direct optical viewfinder in a camera. Such a viewfinder includes a negative lens 120 and a positive lens 122. A partially silvered mirror 124, located between the two lenses 120 and 122, reflects light generated by the display devices 91 through the positive lens 122. The display panel 100 is positioned relative to lens 122 so that the alpha-numeric information displayed is in proper focus.

Other viewfinders, such as those incorporating rangefinders, may also use the present invention.

In operation, a film cartridge having code indicia representing information about the film in the cartridge is inserted into a film-receiving chamber 12 (FIG. 5) of the camera. Assume that the film cartridge carries a 6-bit combination code of the form 000010, as illustrated by the pattern of indicia shown on the cartridge of FIG. 5. In other words and as shown in FIG. 4, the film in the cartridge has a film speed of ASNI 25, it is a color slide film with a color sensitivity to daylight, and the film is a 20-exposure roll.

If a camera operator wishes to know film speed, he closes a momentary switch 130 to initiate the following sequence of operation. Memory pointer 78 advances its count from 0 to 1, and digital control circuit 90 is energized to apply voltage signals to each of pins 32 other than the pin employed as a grounding connection, as previously described. Accordingly, a digital signal is produced on data transfer lines 89 that represents the binary word 000010. This signal is stored temporarily in register 86 of interface unit 56.

Now that data are loaded into register 86, the microprocessor, under the control of program storage 54, transfers these data along data transfer lines 88 into input buffer 67. These data constitute an address in banks 72, and from that address a binary word is transferred to register 66 of the microprocessor.

Still under the control of instructions provided from program storage 54, data are read from ROM 55 into the microprocessor. Since the count provided by memory pointer 78 determines which of the banks 72 is to be read, the data in bank 72A are read when pointer 78 has a count of 1. Thus, data pertaining to film speed information are transferred to the microprocessor. Program storage 54 causes the microprocessor to read the data in memory bank 72A from the particular address that is identified by the data in register 66, that is, address 000010. Thus, for the example being considered, data representing the term "ANSI 25" are read from bank 72A. As mentioned previously, these data are in binary format. Program storage 54 provides instructions to the microprocessor to produce binary output signals that ultimately cause data latch and display device 59 to display "ASNI 25."

Such binary coded output signals are provided from output buffer 68 to current drivers 58A of output device 58. These signals represent addresses for selectively activating PROM's 94A through 94H (FIG. 6), and are transferred by current drivers 58A for processing by data latch and display 59. PROM's 94A through 94H produce output signals to energize diodes in the matrix displays 91A through 91H, respectively. Accordingly, for the example being considered, diodes are energized to form the alphanumeric representation ANSI 25, as shown by the darkened circles in FIG. 6. Further description of the use of PROM's as character generators may be found in *Popular Electronics,* (Ziff-Davis) July 1975, pp. 27 through 30, the disclosure of which is incorporated herein by reference.

The camera operator has been provided with the speed (ANSI) of the film being used. Suppose now the operator wishes to know other information about the film in the cartridge. For example, if the operator wishes to know film type, the microprocessor 52 must read data stored in memory bank 72B. Accordingly, switch 130 is activated to advance the memory pointer count to two. Once this happens, the same sequence of operations occurs as before, except that film type data are read from memory bank 72B from an address that is identified by the data in register 66. In the illustrative example, the representation "COLOR SLIDE" would be displayed on the matrix display elements 91. Of course, any term to be displayed requiring more than seven display characters could be conveniently abbreviated. Similarly, if switch 130 were actuated a third time, memory pointer 78 would be incremented to three, and film color sensitivity information would be displayed, and so on. In this manner a single switch 130 can be used to sequence through each memory bank 72 in ROM 55 to sequentially display any of the film information represented by the code indicia on the film cartridge 14. Button 78A is provided for resetting pointer 78 to zero.

The single switch 130 for sequencing through the ROM memory 55 is described as a preferred embodiment. However it is clear that separate switches 132A, 132B . . . 132N (shown in FIG. 5 in phantom connection to pointer 78) may be used to read stored data from any of the memory banks 72 without sequencing. Actuation of one switch would cause film speed data to be read from bank 72A, actuation of another to read "film type" data from the bank 72B, and so on.

Although electrical contact has been described in a preferred embodiment for detecting the code indicia on cartridge 14, other arrangements for sensing such a code are equally applicable for use with the invention. In FIG. 9A, three probes 134A, 134B and 134C are illustrated. Each probe is biased through a camera wall 135 by means of a spring 136, for contact with a film cartridge 137. Suitable indentations 138 and 139 are provided on the exterior of cartridge 137 for receiving the probes 134. Connections between the probes 134A, B and C and three switches 140A, B and C, respectively, cause the switches to open or close depending on the presence or absence, respectively, of the indentations 138 and 139. If the position of probes 134A and 134C corresponds to binary "0," then the position of probe 134B would correspond to binary "1".

Code-sensing apparatus based on electrical capacitance is diagrammatically illustrated in FIG. 9B. The exterior wall of a film cartridge 141 includes an insulating layer 142 and a grounded conductive overcoat 144 that is removed in selected areas 146 corresponding to the film information to be represented. Suitable grounding can be accomplished by a contact probe which projects from the camera into contact with the overcoat 144. A group of sensing plates 148 are disposed opposite selective areas of the conductive overcoat 144. Where a plate 148 is opposite the conductive overcoat 144, a capacitor is formed that will freely conduct to ground an alternating current generated by a current generator 150. Where the plate 148 is opposite an area 146, only one plate of the capacitor is present and the current generated by the generator 150 will not be grounded. By placing current detectors 152 in the path of the grounded circuits, the flow of current will be detected and thus indicate the presence or absence of an area 146.

Figure 10:
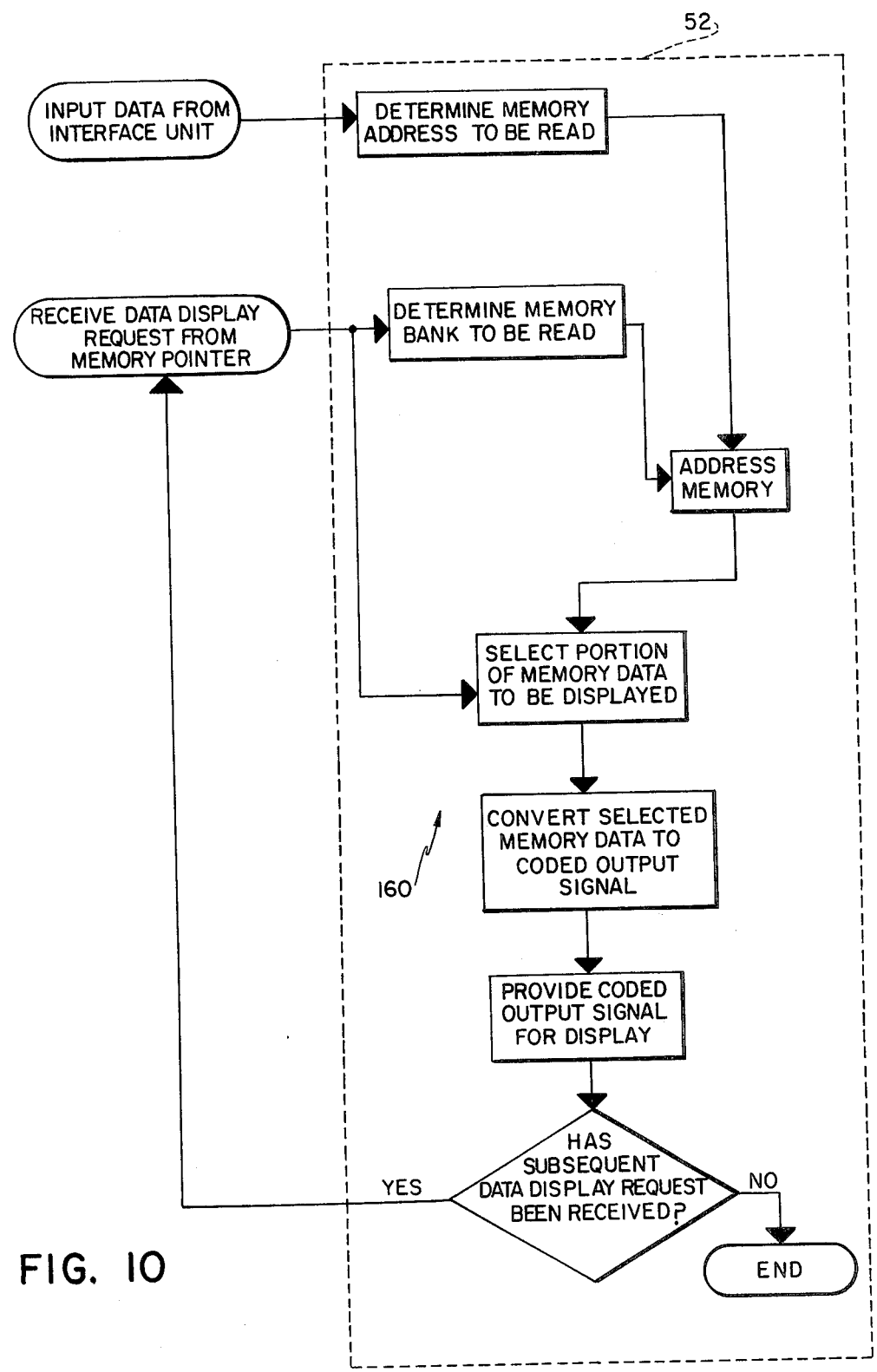
FIG. 10 is a simplified flow chart of a computer program for use with the apparatus of FIG. 5.

A computer program for use with the apparatus of FIG. 5 is illustrated in abbreviated form by the program flow chart of FIG. 10. Data are transferred into the microprocessor 52 from interface unit 56 and memory pointer 78. The program, denoted generally 160, first determines from the signal from pointer 78 from which of the memory banks of memory 55 data are to be read, and from the signal from interface unit 56 from which address in such memory bank data will be read. The program 160 then causes the microprocessor to convert the data read from memory into a coded output signal which is applied to drivers 58A. The microprocessor converts only that portion of the data from memory 55 that represent the particular category of film information to be displayed. This category is represented by the signal provided by memory pointer 78. Program 160 also includes program means to permit the microprocessor to monitor any subsequent request to display data.

For clarity of illustration only four categories of film information have been identified. However, the invention clearly lends itself to as many categories of information as can be conveniently coded on a film cartridge. For example, it may be desirable to code film exposure latitude, film expiration date, process information, emulsion information, film reciprocity characteristics, and so on. Some of the information may be more useful in processing than display. Other information, such as, for example, film speed, may be doubly useful in serving for display and for automatic exposure control.

The invention has been described in detail with particular reference to a preferred embodiment thereof, but it will be understood that variations and modifications can be effected within the spirit and scope of the invention.

What is claimed is:

1. In a camera having means for receiving a film cartridge, the cartridge having code indicia representing a plurality of characteristics of film in the cartridge, the improvement comprising:
   (a) means for sensing said indicia;
   (b) means controlled by said sensing means for producing a first output signal representing said characteristics;
   (c) characteristic selector means for providing a second output signal representing a film characteristic selected to be displayed;
   (d) randomly accessible memory means having addressable data storage locations for storing data representing respective characteristics of a variety of photographic films;
   (e) electronic computer means, coupled to said signal producing means and said characteristic selector means, for receiving said first output signal and said second output signal, and, in response thereto, for (1) randomly accessing said addressable data storage locations to retrieve data corresponding to a characteristic of the film in the cartridge that was selected, and (2) generating a third output signal corresponding to said retrieved data; and
   (f) display means coupled to said computer means for receiving said third output signal and, in response thereto, for producing an alphanumeric display identifying said selected characteristic.

2. In a camera having means for receiving a film cartridge, the cartridge having code indicia representing a plurality of characteristics of film in the cartridge, the improvement comprising:
   (a) means settable in accordance with said indicia for producing a first binary coded output signal representing said characteristics;
   (b) characteristic selector means for providing a second binary coded output signal representing a film characteristic selected to be displayed;
   (c) randomly accessible memory means having addressable data storage locations for storing data representing respective characteristics of a variety of photographic films;
   (d) electronic computer means, coupled to said signal producing means and said characteristic selector means, for receiving said first binary coded output signal and said second binary coded output signal, and, in response thereto, for randomly accessing said addressable data storage locations to retrieve data corresponding to a characteristic of the film in the cartridge that was selected, said electronic computer means including means for providing a third binary coded output signal corresponding to said retrieved data; and
   (e) display means coupled to said computer means for receiving said third binary coded output signal and, in response thereto, for producing an alphanumeric display identifying said selected characteristic.

3. In a camera having means for receiving a film cartriddge, the cartridge having code indicia representing a plurality of characteristics of film in the cartridge, the improvement comprising:
   (a) means for detecting said indicia;
   (b) means controlled by said detecting means for producing a first binary coded output signal representing said code indicia;
   (c) characteristic selector means for providing a second binary coded output signal representing a film characteristic selected to be displayed;
   (d) randomly accessible memory means having addressable data storage locations for storing a set of data in respective data storage locations, said data set representing a catalog of characteristics of a variety of photographic films;
   (e) programmable electronic computer means, coupled to said signal producing means and said characteristic selector means, for receiving said first binary coded output signal and said second binary coded output signal, said computer means having a stored program for causing said electronic computer means, in response to said first binary coded output signal and said second binary coded output signal, to (1) randomly access said addressable data storage locations for retrieving a subset of said stored data corresponding to a characteristic of film in the cartridge that was selected, and (2) provide a third binary coded output signal corresponding to said retrieved data; and (f) display means responsive to said electronic computer means for receiving said third binary coded output signal and, in response thereto, for producing an alphanumeric display identifying said selected film characteristic.

4. In a camera having a viewfinder, display apparatus for producing an alphanumeric display in the viewfinder, and means for receiving a film cartridge, the cartridge having coded representations corresponding to a plurality of characteristics of film in the cartridge, the improvement comprising:
(a) means for sensing said coded representations;
(b) means controlled by said sensing means for producing a first output signal at least a portion of which represents one of said characteristics of the film in the cartridge;
(c) randomly accessible memory means having addressable data storage locations for storing a set of data, representing characteristics of a variety of photographic films;
(d) manually operable switch means for providing, upon operation thereof, a second output signal, representing a film characteristic selected to be displayed;
(e) electronic computer means coupled to said signal producing means and said switch means for receiving said first and second output signals and, in response thereto, for (1) randomly accessing an addressable data storage location in said memory means to retrieve data corresponding to a characteristic of the film in the cartridge that was selected, and (2) generating a third output signal corresponding to said retrieved data; and
(f) display means, including said display apparatus, coupled to said computer means for receiving said third output signal and, in response thereto, for producing an alphanumeric display identifying said selected characteristic.

5. In a camera having means for receiving a film cartridge, the cartridge having code indicia representing at least one characteristic of film in the cartridge, the improvement comprising:
(a) means for (1) sensing said indicia, and (2) producing a first output signal representing said characteristic;
(b) randomly addressable memory means having a plurality of memory banks which define addressable data storage locations for storing respective data representing characteristics of a variety of photographic films, each respective bank storing data representing a particular category of film characteristics;
(c) manually operable switch means for providing a second output signal, responsive to the manual operation thereof, representing a film characteristic selected to be displayed;
(d) electronic computer means, coupled to said sensing and producing means and said switch means, for receiving said first output signal and for receiving said second output signal, respectively, and, in response thereto, randomly accessing (1) a particular one of said memory banks in accordance with said second output signal, and (2) a data storage location in said particular memory bank in accordance with said first output signal to retrieve data corresponding to a characteristic of the film in the cartridge that was selected, said computer means including means for providing a third output signal corresponding to said retrieved data; and
(e) display means coupled to said computer means for receiving said third output signal and, in response thereto, for producing an alphanumeric display identifying said selected film characteristic.

6. A method of identifying on an energizable alphanumeric display means of a photographic camera any of a plurality of film characteristics represented by code indicia on a film cartridge in said camera, said method comprising:
(a) sensing said indicia;
(b) producing in response to said indicia a first coded signal representing said film characteristics;
(c) producing a second coded signal representing a film characteristic selected to be displayed;
(d) accessing directly, in response to said first coded signal and said second coded signal, data memory means containing data representing respective characteristics of a variety of photographic films to retrieve data corresponding to a characteristic of film in the cartridge that was selected; and
(e) energizing, in response to said retrieved data, said energizable display means to produce an alphanumeric display identifying said selected film characteristic.

7. A method for identifying on an energizable alphanumeric display means of a photographic camera any of a plurality of film characteristics represented by code indicia on a film cartridge in said camera, said method comprising:
(a) sensing said indicia to produce a first output signal representing said film characteristics;
(b) producing a second output signal which constitutes a request to display a particular film characteristic;
(c) directing, in response to said first and said second output signals, programmable electronic computer means to access directly data memory means containing data representing respective characteristics of a variety of photographic films to retrieve data corresponding to the characteristic of film in the cartridge that was requested;
(d) deriving from said computer means a third output signal corresponding to said retrieved data; and
(e) processing said third output signal in said energizable alphanumeric display means to produce an alphanumeric display identifying said particular requested film characteristic.

* * * * *